United States Patent Office 3,055,873
Patented Sept. 25, 1962

3,055,873
PREPARATION OF POLYITACONIC ACID
Ezekiel H. Hull and James M. Leach, Greensboro, N.C., and Bryce E. Tate, Groton, Conn., assignors to Chas. Pfizer & Co., Brooklyn, N.Y., a corporation of Delaware
No Drawing. Filed July 27, 1960, Ser. No. 45,537
4 Claims. (Cl. 260—78.5)

This application is concerned with methods for the preparation of water-soluble polycarboxylic acid resins, and more particularly with a new and improved method for the preparation of poly (itaconic acid) resins.

Methods for the preparation of poly (itaconic acid) have been described in the past. Thus, D'Alelio, in U.S. Patent 2,294,226, has proposed that polymerized dimethyl itaconate be converted to the dipotassium salt by exhaustive reflux with alcoholic potassium hydroxide. The patent reports that the polyitaconic acid obtained by treating this salt with inorganic acids is water-insoluble.

Marvel, in the Journal of Organic Chemistry, vol. 24, pp. 599–605 (1959), has described the polymerization of itaconic acid in dilute hydrochloric acid. The poly (itaconic acid) obtained is water-soluble, but its preparation is quite slow, only 35% polymerization being achieved in 68 hours. It is further reported that acrylic acid may be copolymerized with itaconic acid in 90% yield in about seven days. Polymerization of itaconic acid in other solvents is also quite slow. For example, 4% polymerization has been obtained after 140 hours in refluxing acetone with benzoyl peroxide catalyst.

In addition to the aforementioned procedures, the polymerization of itaconic anhydride has been studied as an approach to the preparation of poly (itaconic acid). However, it is found that the polymerization rate is extremely erratic, possibly due to trace impurities, such as itaconic acid, which strongly inhibit the reaction. Purification to overcome this problem is quite difficult, and no significant criterion of purity other than the polymerization rate has been found.

A method for the preparation of poly (itaconic acid) has now been discovered which eliminates the difficulties inherent in the earlier procedures. According to the new process, a β-monoalkyl itaconate is polymerized, and the resulting polymer hydrolyzed to the desired product. It has been discovered that the polymerization of β-monoalkyl itaconates is extremely rapid. For example, the bulk polymerization of monobutyl itaconate with 0.5% benzoyl peroxide at 60° C. is about 70% complete in only two hours. Under the same conditions dimethyl itaconate is only about 11% polymerized. Furthermore, the hydrolysis of poly (monoalkyl itaconates) is characterized by surprising speed and ease. Above all, the poly (itaconic acid) obtained by the new process is water-soluble even at acid pH. The same is not true of hydrolyzed polymers of itaconate diesters. In fact, carboxylic acid polymers, including poly (acrylic acids), are usually incompletely soluble in water.

The polymeric itaconic acids obtained by the process of the present invention are particularly useful as detergent aids in the prevention of soil redeposition in laundering. Extremely low concentrations, as little as 0.04% or less, are effective. They are especially valuable in this application in view of their substantial freedom from thickening action in the aqueous detergent at the effective levels. The new polymers also form clear, extremely tough films, and can be applied from aqueous solution in the sizing of yarn, to impart abrasion resistance for weaving, whereupon they are readily removed again with water. They are likewise suitable as deflocculating agents for paper making, deinking agents in newsprint repulping, and as dispersing agents in latex paints, ceramic glazes, and ore flotation. As suspending agents for aqueous insecticide emulsions, these products are particularly useful since their adhesive properties help to hold the insecticide on the treated surface.

The β-monoalkyl itaconates suitable for use in the new process may contain either straight- or branched-chain alkyl groups. While the size of the alkyl group is not critical, usually alkyl groups of from 1 to about 18 carbon atoms, and particularly from 1 to about 6 carbon atoms, will be preferred. Alkyl groups of even higher molecular weight are also acceptable, but these necessarily represent lower production capacity, since the alkyl group is subsequently removed by hydrolysis.

The monoesters are readily prepared by standard methods, such as warming of equimolar proportions of itaconic anhydride and the appropriate alcohol, or azeotropic esterification of equimolar proportions of the alcohol and itaconic acid in the presence of a trace of sulfuric or other acid catalyst, preferably in a solvent such as benzene. The higher monoesters are perhaps best prepared through itaconic anhydride, while the lower esters, at least up to about monobutyl itaconate, may be conveniently prepared from itaconic acid and subsequently purified by distillation at reduced pressure. The lower esters, from monomethyl to monobutyl itaconate, are low-melting crystalline solids; higher itaconates are liquids or waxy solids at about room temperature.

While the monomer employed in the new process will generally be an unmodified β-monoalkyl itaconate, or a mixture of several such itaconate monoesters, it is also possible to copolymerize the itaconate with up to about 25% by weight of another monomer having one polymerizable double bond. Such comonomers as acrylic acid, maleic anhydride, styrene, or methyl methacrylate may be employed, for example. Comonomer concentrations in excess of about 25% by weight of the total monomer may adversely affect the water solubility of the hydrolyzed copolymer, and should generally be avoided.

Polymerization of the β-monoalkyl itaconate, preferably conducted under an inert gas such as nitrogen, may be initiated by a source of free radicals, such as one of the free-radical polymerization catalysts. Suitable initiators include, for example, benzoyl peroxide, lauroyl peroxide, tertiary butyl perbenzoate, azobisisobutyronitrile, isopropylperoxydicarbonate, and the like. Initiator concentrations ranging from about 0.05 to about 0.75 mol percent, based on the monomer, are usually appropriate. Initiator concentrations outside this range may also be employed, of course. As expected, the lower initiator concentrations favor the production of higher polymer molecular weights.

The itaconate may be polymerized in molten condition, either undiluted or dispersed in the form of small droplets in a continuous suspension medium such as water (or an aqueous salt solution in the case of the lower, more water-soluble monoesters). If suspension polymerization is selected, it is generally beneficial to include a suspending agent to reduce the tendency of the monomer droplets to coalesce during polymerization. There are a number of well known agents suitable for this purpose. Polyvinyl alcohol, about 0.5% w./v. based on the aqueous phase, gives excellent results.

In addition to melt polymerization, it is also possible to conduct the polymerization in solution. In this case a solvent must be selected which is inert with respect to the carboxylic acid and ester groups of the monoester. Water is unsuitable for solution polymerization, since it may lead to partial hydrolysis, and consequent substantial reduction in polymerization rate. Similarly, basic solvents lead to ionization of the carboxylic acid group and suppression of polymerization rate. Such solvents as benzene, acetone, and dioxane do not react with the acid or ester groups, and are eminently suitable media. The solvent need not be one in which the polymer is soluble. For example, benzene may be employed for the polymerization of monomethyl itaconate, even though the polymer precipitates as formed. While the concentration of the monomer in solution is not critical, concentrations of at least about 10–20% by weight will generally be preferred for highest polymerization rate and practical production capacity. It has been observed that varying the concentration has relatively little effect on the molecular weight of the polymer produced, although, as expected, the higher monomer concentrations generally provide polymers of slightly higher molecular weight.

Polymerization temperature is perhaps the best way of controlling the molecular weight of the polymer obtained. Higher molecular weights may be achieved, where desired, at the lower temperatures, and lower molecular weights at the higher temperatures. The polymerization temperature is preferably maintained between about 25 and about 140° C. for best results. Temperatures materially below 25° C. usually lead to slow polymerization, whereas those above about 140° C. may cause itaconic anhydride formation and in this way also reduce polymerization rate.

When polymerization is substantially complete, generally within a few hours depending on the temperature, catalyst, and other conditions, the polymerized itaconate monoester is prepared for hydrolysis. Bulk polymers will generally be crushed or ground; suspension polymers may be filtered or separated by decantation from the water or other polymerization medium; and solution polymers may be recovered in solid form by precipitation with a non-solvent such as petroleum ether. Suspension and solution polymers may also be hydrolyzed directly in the polymerization medium without prior separation. Polymer particles may be purified if desired. A suitable procedure consists of solution in a solvent, such as dioxane, followed by reprecipitation by addition of a non-solvent such as petroleum ether. However, it is ordinarily unnecessary to effect such fractionation at this stage, and generally the hydrolysis step may follow immediately.

Hydrolysis of the monoester polymers is effected with extreme ease. Either acid or basic hydrolysis may be employed, although acid hydrolysis is generally most convenient. For the latter purpose, an aqueous mineral acid, e.g. 5–6 N hydrochloric acid, is appropriate. The polymer is boiled with the acid, preferably with distillation of the byproduct alcohol to hasten hydrolysis. When the reaction is substantially complete, which generally requires only 2–6 hours at most, the reaction mixture may be concentrated to a heavy syrup, diluted with a solvent such as water, methanol or ethanol, and the poly (itaconic acid) precipitated by addition of a non-solvent such as acetone, methyl ethyl, ketone, or dioxane.

Similarly, alkaline hydrolysis may be conducted by boiling in an aqueous solution containing from about 2 to about 3 equivalents of a base such as sodium or potassium hydroxide or carbonate per mole of itaconate. It is better not to employ base in excess of about 3 equivalents per mole of itaconate, since more is unnecessary and may be inconvenient to remove later. Of course, if the itaconate has been copolymerized with another carboxylic monomer such as acrylic acid or methyl methacrylate, due allowance for the base requirement of this component should be made in determining the quantity of base to be employed. Alkaline hydrolysis is generally complete in several hours and the resulting solution of the polyitaconate salt may be converted to the acid form by treatment with a cation exchange resin containing sulfonic acid groups. Any of the commercially available sulfonated phenol-formaldehyde or styrene-divinylbenzene ion-exchange resins will be suitable. The poly (itaconic acid) may then be recovered from solution by precipitation with a non-solvent such as acetone.

A measure of the molecular weight of the itaconic acid polymers produced by the new process may be obtained by determining the viscosity of their water solutions. The polymer is dissolved in water, suitably to form a 0.33% solution, and the flow time of a 10 ml. aliquot determined in an Ubbelohde viscometer at 20° C. Specific viscosity is then calculated from the expression $$\eta_{sp} = \frac{d_1 t_1 - d_0 t_0}{d_0 t_0}$$

where $d_1$ is the density of the polymer solution
$d_0$ is the density of water
$t_1$ is the flow time of the polymer solution
$t_0$ is the flow time of water The "reduced viscosity" is then calculated as $\eta_{sp}/C$, where C is the concentration of the polymer in the solution, expressed as grams per 100 ml. Wherever values for $\eta_{sp}/C$ are reported herein, they are to be understood to refer to aqueous solutions of 0.33 gram polymer per 100 ml. solution.

The value $\eta_{sp}/C$ for the poly (itaconic acids) produced by the new process may be varied to meet requirements by control of the polymerization conditions. Thus, in preparing detergent aids to prevent soil redeposition, it has been found that the polymers of relatively low molecular weight are best, for example, those having $\eta_{sp}/C$ of from about 0.02 to about 3, and preferably 0.02–0.35. The polymers of higher molecular weight are also useful for this application, but they cause a slight thickening of the detergent solutions. Similarly, for the sizing of cloth, the higher molecular weight polymers usually give the better results, that is, those having $\eta_{sp}/C$ of about 1–5 or more. While those of lower values are also useful in sizing, they impart less "body" or "hand."

As previously mentioned, the lower polymerization temperatures produce polymers having relatively high $\eta_{sp}/C$ values, and higher temperatures produce polymers of lower $\eta_{sp}/C$. Some further degree of control may be obtained by varying monomer and initiator concentration, although these factors usually have less effect than does temperature. High initiator concentrations favor somewhat lower $\eta_{sp}/C$ values, and lower concentrations have the opposite result. This effect is most pronounced at polymerization temperatures below about 60° C. If the polymerization is conducted in a solvent, the more dilute solutions produce polymers of somewhat lower $\eta_{sp}/C$ values than the more concentrated solutions. These factors, more fully illustrated in the examples, thus permit close control of molecular weight to most fully satisfy the requirements of the particular application.

The new process which has been described is clearly a valuable advance in the preparation of poly (itaconic acids). The polymerization is must faster than in prior art processes and hydrolysis is both faster and more reliable than heretofore. Fully water-soluble polymers having a variety of applications are produced in good yield and with excellent control of molecular weight.

The following examples are provided by way of illustration and should not be interpreted as limiting the invention, many variations of which are possible without departing from the spirit or scope thereof.

*Example I*

100 grams monobutyl itaconate is melted and 0.056 gram (0.05 mol percent) diisopropylperoxydicarbonate mixed in. The flask is flushed with nitrogen and left in a 40° C. constant temperature bath for 2 hours.

86.6 grams of the resulting polymer are pulverized and combined with 86 ml. of water and 86 ml. concentrated hydrochloric acid in a flask equipped with stirrer, condenser and dropping funnel. The mixture is distilled slowly to effect hydrolysis and to remove the byproduct butanol, water being added dropwise to replace that distilled off. After 3 hours the calculated volume of butanol has been collected and the mixture is concentrated to a clear, viscous syrup. This residue is rinsed into 2 liters of acetone with the aid of 75 ml. water. The resulting gelatinous precipitate is boiled with acetone to aid in the removal of water, and the acetone separated by decanting. Trituration of the residue with fresh acetone gives 51.9 grams (86% of theory) of poly (itaconic acid) in the form of a white powder having $\eta_{sp}/C=4.7$ in 0.33% aqueous solution.

*Example II*

The experiment of Example I is repeated except as noted below, and poly (itaconic acid) products are again prepared in good yield:

| Polymerization Temperature, °C. | Initiator | Product $\eta_{sp}/C$ |
|---|---|---|
| 60 | 0.75 mol percent azobisisobutyronitrile | 1.31 |
| 60 | 0.50 mol percent azobisisobutyronitrile | 1.64 |
| 60 | 0.25 mol percent azobisisobutyronitrile | 2.1 |
| 60 | 0.05 mol percent benzoyl peroxide | 3.4 |

*Example III*

The previous experiments are again repeated, with changes as noted, to prepare a series of itaconic acid polymers of somewhat lower molecular weight:

| Polymerization Temperature, °C. | Initiator | Product $\eta_{sp}/C$ |
|---|---|---|
| 75 | 0.25 mol percent benzoyl peroxide | 0.35 |
| 75 | 0.50 mol percent benzoyl peroxide | 0.38 |
| 75 | 0.75 mol percent benzoyl peroxide | 0.37 |
| 90 | 0.25 mol percent benzoyl peroxide | 0.14 |
| 90 | 0.50 mol percent benzoyl peroxide | 0.11 |
| 90 | 0.75 mol percent benzoyl peroxide | 0.11 |

*Example IV*

β-Monomethyl itaconate is polymerized at 70° C. by the procedure of the preceding examples, employing 0.25 mol percent benzoyl peroxide as initiator. After hydrolysis as before, poly (itaconic acid) having $\eta_{sp}/C=0.32$, as measured in 0.33% aqueous solution, is obtained.

*Example V*

A mixture of 81 grams β-monobutyl itaconate and 19 grams acrylic acid is polymerized at 60° C. with 0.25 mol percent benzoyl peroxide as before. After hydrolysis as in Example I, poly (itaconic acid) having $\eta_{sp}/C=0.54$ is obtained.

*Example VI*

β-Monobutyl itaconate is polymerized in benzene solution with 0.50 mol percent azobisisobutyronitrile, based on the itaconate, by heating at 60° C. overnight. The resulting poly (monobutyl itaconate) is recovered by concentrating the solution and adding petroleum ether. The precipitated polymer is hydrolyzed as in Example I to obtain itaconic acid polymer in good yield. The effect of concentration during polymerization is as follows.

| Initial monomer concentration in $C_6H_6$, percent: | Poly (itaconic acid), $\eta_{sp}/C$ |
|---|---|
| 50 | 0.27 |
| 67 | 0.51 |
| 80 | 0.58 |

*Example VII*

To a 500 ml. flask equipped with stirrer, reflux condenser and thermometer is added 100 ml. water and 0.5 gram polyvinyl alcohol (Elvanol 50–42, an 86–89% hydrolyzed polyvinyl acetate having a viscosity of 35–45 cp. in 4% water solution at 20° C., available from the Du Pont Company). The polyvinyl alcohol is dissolved by heating to 60° C., and a previously prepared solution of 0.65 gram (0.5 mol percent) benzoyl peroxide in 100 grams β-monobutyl itaconate is added. Agitation is adjusted to about 100 r.p.m. to obtain fine monomer droplets, and heating is continued at 60° C. for 24 hours to insure complete polymerization.

The mixture is cooled, 100 ml. concentrated hydrochloric acid added, and hydrolysis and isolation of poly (itaconic acid) conducted as in the earlier examples.

*Example VIII*

The suspending action of the polymeric acids of Examples III–VI is tested in the following manner.

To a solution of the polymer in 100 ml. distilled water is added one gram of activated carbon. The mixture is shaken for 15 seconds and allowed to settle. After 24 hours, samples containing 0.4 and 0.04% w./v. of one of the poly (itaconic acids) still have not separated. When the polymer is omitted, separation of the carbon occurs almost immediately after shaking.

*Example IX*

The products of Examples III–VI are tested as detergent aids in the following manner.

A 0.50% detergent solution in distilled water is prepared. The detergent employed has the following composition:

| | Parts by weight |
|---|---|
| Santomerse No. 3 [a] | 4 |
| Sodium carbonate | 4 |
| Sodium metasilicate | 2 |

[a] 65% dodecyl benzene sodium sulfonate, available from the Monsanto Chemical Company.

To 100 ml. of this solution is added 1 gram of the poly (itaconic acid), followed by 30 drops of the following suspension:

| | |
|---|---|
| Activated carbon | grams 14 |
| Tergitol Nonionic NPX [b] | do 0.2 |
| Distilled water | ml 86 |

[b] Alkyl phenyl monoether of polyethylene glycol (surface active agent) available from Carbide and Carbon Chemicals Company.

The solution is heated to 140° F. and a 2.5 x 2.5 inch square of bleached cotton sheeting added. The mixture is shaken for 15 seconds in an 8 oz. bottle and the cloth swatch removed and rinsed for 10 seconds in 140° F. distilled water. The swatches are significantly lighter in color than control swatches treated in the same manner without addition of the poly (itaconic acid).

*Example X*

The products of Examples I and II are dissolved in water to form 5% w./v. solutions. Immersion of cotton swatches in one of these solutions, followed by drying, imparts a stiff hand to the cloth. The polymers are readily removed by rinsing the swatches in water.

*Example XI*

The following compositions are polymerized for 6 hours in molten form and then hydrolyzed to provide water-soluble itaconic acid polymers and copolymers.

| β-monoalkyl Itaconate | Initiator | Polymerization Temperature °C. |
|---|---|---|
| isopropyl | 0.5 mol percent AZBN | 60 |
| n-hexyl | 0.1 mol percent IPC | 25 |
| 2-ethylhexyl | 0.5 mol percent AZBN | 60 |
| n-dodecyl | 0.75 mol percent $Bz_2O_2$ | 90 |
| octadecyl | 0.75 mol percent TBP | 140 |
| butyl, plus 10% maleic anhydride. | 0.5 mol percent AZBN | 60 |
| butyl, plus 10% methyl methacrylate. | 0.1 mol percent IPC | 40 |
| butyl, plus 10% styrene | 0.1 mol percent IPC | 40 |

AZBN = azobisisobutyronitrile.
IPC = diisopropylperoxydicarbonate.
$Bz_2O_2$ = benzoyl peroxide.
TBP = ter. butyl perbenzoate.

What is claimed is:

1. A process for the preparation of a water-soluble polycarboxylic acid resin comprising the free-radical polymerization at a temperature between about 25 and about 140° C., of a β-monoalkyl ester of itaconic acid with from 0 to about 25% of a comonomer having one polymerizable double bond, followed by hydrolysis of the resulting polymer.

2. The process of claim 1 wherein said monomers are polymerized in undiluted liquid form.

3. The process of claim 1 wherein said monomers are polymerized in suspension.

4. The process of claim 1 wherein said monomers are polymerized in a solvent which is inert with respect to the carboxylic acid and ester groups of said monoester.

References Cited in the file of this patent

UNITED STATES PATENTS 2,294,226     D'Alelio _____ Aug. 25, 1942